United States Patent [19]
Anderson

[11] 3,842,732
[45] Oct. 22, 1974

[54] TAILGATE CONTROL FOR STACKERS
[75] Inventor: John Dale Anderson, Canton, Kans.
[73] Assignee: Hesston Corporation, Hesston, Kans.
[22] Filed: May 17, 1973
[21] Appl. No.: 361,194

[52] U.S. Cl............... 100/270, 100/188 R, 56/344, 130/20
[51] Int. Cl............................................. B30b 1/08
[58] Field of Search.................... 100/270, 188–189, 100/218, 245–246, 252, 255, 258; 56/13.3, 13.5, 16.6, 294, 341, 343–344, 346, 364; 130/20; 214/508, 522

[56] References Cited
UNITED STATES PATENTS

| | | | |
|---|---|---|---|
| 1,377,365 | 5/1921 | Roach.................................. | 130/20 |
| 1,411,490 | 4/1922 | Graham................................ | 130/20 |
| 2,672,808 | 3/1954 | Eldert.................................. | 100/188 R |
| 3,198,107 | 8/1965 | Gawreluk........................... | 100/188 R |
| 3,552,109 | 1/1971 | Murray et al..................... | 56/344 X |
| 3,691,741 | 9/1972 | White et al........................... | 56/344 |
| 3,749,003 | 1/1973 | Wilkes et al..................... | 100/255 X |
| 3,754,388 | 8/1973 | Neely............................. | 214/522 X |

Primary Examiner—Robert W. Jenkins
Assistant Examiner—Arthur O. Henderson
Attorney, Agent, or Firm—Schmidt, Johnson, Hovey & Williams

[57] ABSTRACT

Tailgate operation on a stack-forming implement is responsive to the reciprocable press of the implement by virtue of extensible linkage interconnecting the tailgate and actuating mechanism for the press. Because of the extensibility of the linkage, the press may be reciprocated without operating the tailgate while the tailgate is locked in a closed condition and the linkage is extended and retracted by the mechanism in lost motion fashion. A special spring arrangement connected with the tailgate serves the dual functions of initiating movement of the tailgate away from its closed position and cushioning the tailgate as it gravitates beyond its initially opened condition.

18 Claims, 6 Drawing Figures

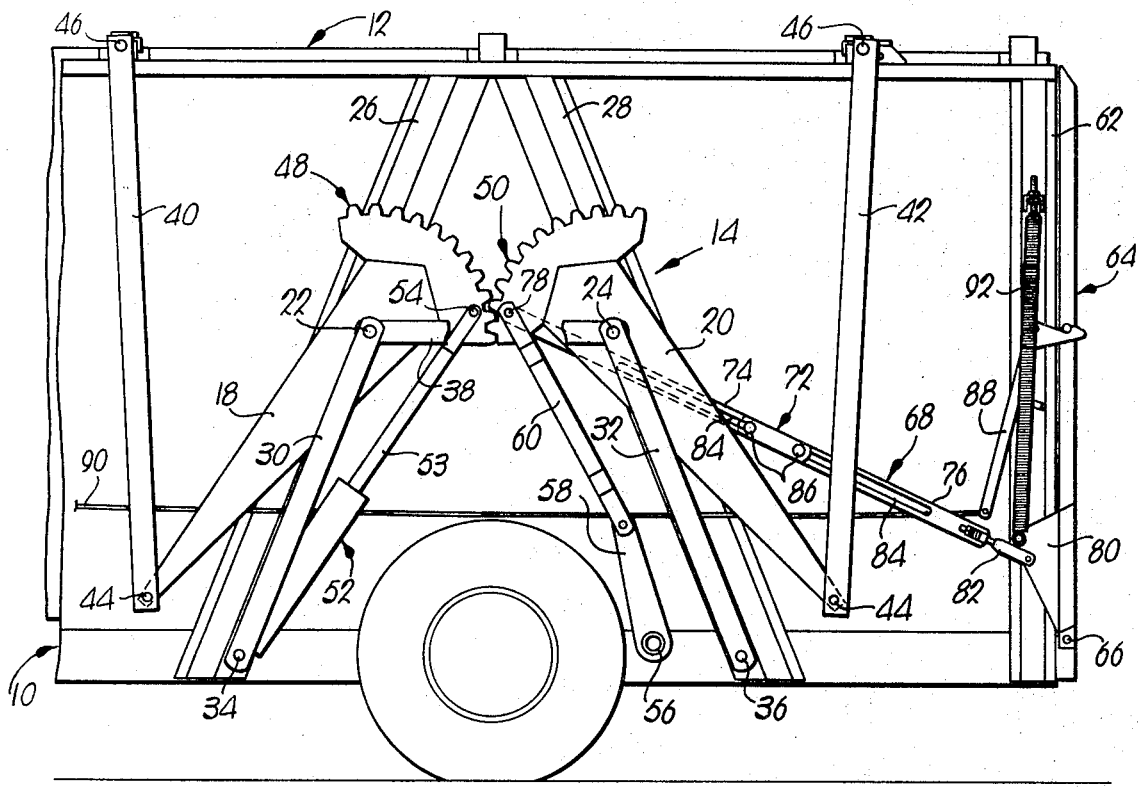

TAILGATE CONTROL FOR STACKERS

This invention relates to improvements in stack-forming implements of the kind disclosed in U.S. Pat. Nos. 3,556,327 issued in the name of Garrison on Jan. 19, 1971; 3,691,741 issued in the name of White, et al. on Sept. 19, 1972; Application For U.S. Letters Patent Ser. No. 82,900 now U.S. Pat. No. 3,732,672 filed Oct. 22, 1970 in the name of Adee, et al.; and Application For U.S. Letters Patent Ser. No. 218,889 now U.S. Pat. No. 3,757,687 filed in the name of Brooks, et al. on Jan. 19, 1972. Accordingly, the above two patents are incorporated herein by reference as need be for a full understanding of the present invention.

An important object of the present invention is to provide a tailgate control which is suitable for use on stacking implements of the type above referred to and, particularly, on stacking implements having press actuating mechanism of the kind illustrated in pending application Ser. No. 218,889 now U.S. Pat. 3,757,687 oppositely swingable, intermeshing beams for transmitting the hydraulic power of a piston and cylinder assembly to the press of the implement. As will become apparent from the material which follows, however, the tailgate control of the present invention is not limited to press actuating mechanism of the aforesaid, intermeshing type, but is well suited for use with other types of actuating mechanisms as well.

Another important object of this invention is to provide a control which utilizes the power and movement of the press and its associated actuating mechanism, yet which allows selective operation of the tailgate with respect to operation of the press.

An additional important object of the instant invention is to provide a non-complex, mechanically trouble free tailgate control.

A further important object of this invention is the provision of a special safety spring which both initiates opening of the tailgate and cushions descent of the latter after the tailgate is initially opened.

In the drawings:

FIG. 1 is a fragmentary, side elevational view of a stack-forming implement employing a tailgate control made in accordance with the present invention, the press of the implement being shown in its fully lowered position;

FIG. 2 is a fragmentary, side elevational view of the implement showing the condition of the tailgate control when the press is fully raised;

Figure 3:
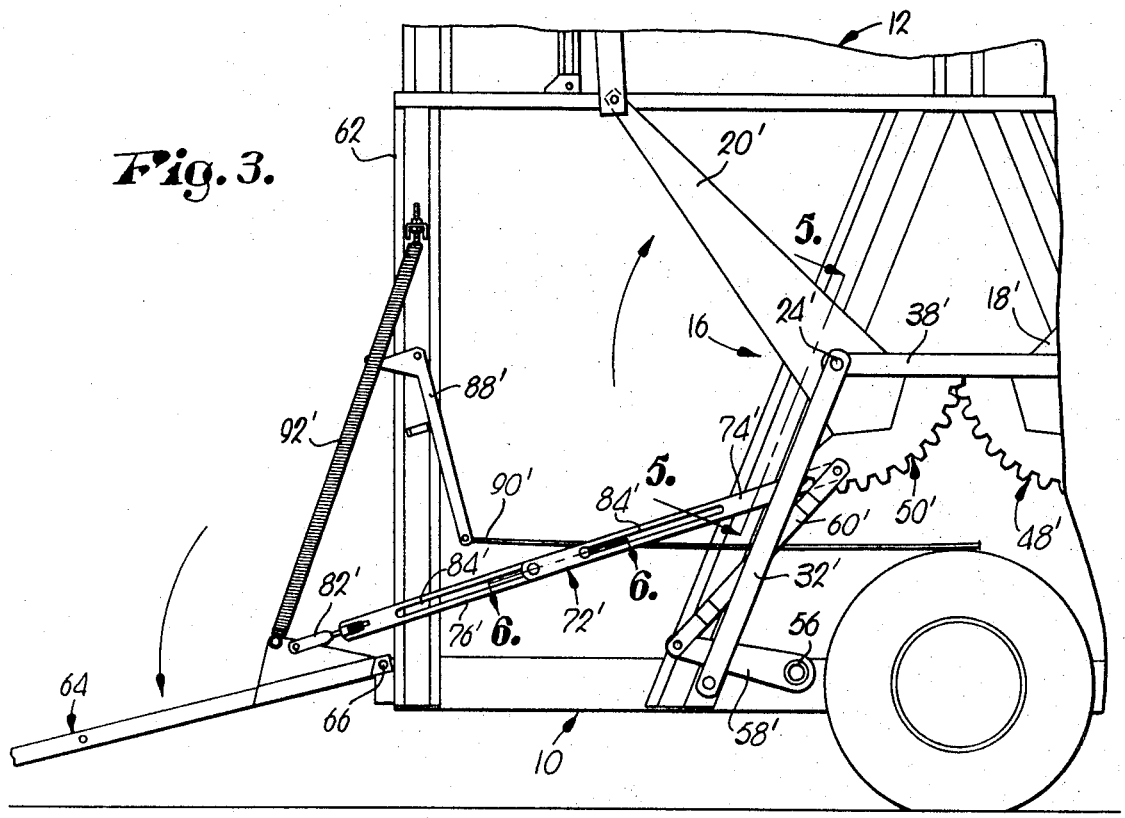
FIG. 3 is a fragmentary elevational view of the opposite side of the implement showing the condition of the tailgate control when the press is raised and the tailgate is lowered.

In view of the full disclosure of what is meant herein by a stack-forming implement as set forth in U.S. Pat. Nos. 3,556,327 and 3,691,741, suffice it to point out that the wheeled vehicle shown in the drawings may be towed by a tractor along a windrow of hay such that the hay is picked up and blown into a hollow body or container 10 beneath a press 12. The press 12 is carried by the body 10 for vertical reciprocation such that the press may be lowered at least once in order to compact the hay collected within the body 10.

Two mechanisms 14 and 16, one on each side respectively of the body 10, are provided for reciprocating the press 12. Inasmuch as the mechanisms 14 and 16 are identical, it is but necessary to detail the nature of the mechanism 14, it being understood that corresponding components of mechanism 16 bear primed numerals otherwise identical to their counterparts in mechanism 14. It includes a pair of substantially identical arms or beams 18 and 20 which, in the form chosen for illustration, are essentially triangular in configuration. Beams 18 and 20 are mounted on the body 10 exteriorly thereof for vertical swinging movement about horizontal shafts 22 and 24 respectively, shafts 22 and 24 projecting outwardly from reinforcing studs 26 and 28 respectively forming a part of the proximal sidewall of the body 10. The outer ends of the shafts 22 and 24 are supported by elongated straps 30 and 32 respectively attached at their lower ends by corresponding pins 34 and 36 projecting outwardly from the studs 26 and 28. A crossbar 38 adjacent the straps 30 and 32 interconnects the shafts 22 and 24.

The beams 18 and 20 are coupled with the press 12 by connectors 40 and 42 respectively through the use of pivot pins 44 at the narrow corners of the beams 18 and 20 and by pivot pins 46 projecting outwardly from the press 12 above the body 10. The upper pins 46 are spaced longitudinally of the press 12 such that the mechanisms 14 and 16 are coupled with the press 12 adjacent each of the four corners of the latter. The sidewalls of the body 10 provide lateral stability for the press 12, and the press 12 is restrained against fore-and-aft movement relative to the body 10 by suitable guides between the press 12 and the body 10 (not shown).

The wider ends of the beams 18 and 20 remote from the pivot pins 44 are provided with an arcuate series of gear teeth 48 and 50 respectively, such teeth 48 and 50 remaining in mesh at all times such that swinging movement of the beam 18 is imparted from gear teeth 48 to the gear teeth 50, causing the beam 20 to swing simultaneously with the beam 18.

A double acting, fluid pressure piston and cylinder assembly 52, pivotally interconnecting the body 10 and the beam 18, includes a piston stem 53 pivotally connected at its upper end to gear tooth segment 48 of the arm 18 by a pivot pin 54.

An elongated torsion tube 56 traverses the body 10, is rotatably carried thereby, and has a crank 58 rigid thereto which is pivotally coupled with the gear tooth segment 50 of the beam 20 by an elongated member 60, rendering the torsion tube 56 common to the two mechanisms 14 and 16.

The rear end of the body 10, denoted by the numeral 62, is itself open, but is normally closed by a tailgate 64 pivotally mounted at 66 to the body 10 for swinging movement toward and away from end 62 about a horizontal axis. A pair of identical tailgate controls 68 and 70 of the present invention are provided for opposite sides of the body 10, only control 68 being hereinafter described in detail with corresponding parts of control 70 denoted by identical primed numerals.

Figure 4:
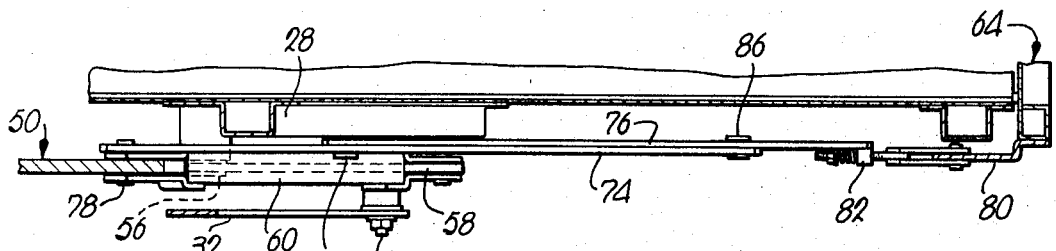
FIG. 4 is an enlarged, fragmentary cross sectional view taken on line 4—4 of FIG. 2.
Figure 6:
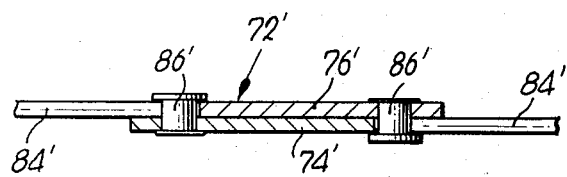
FIG. 6 is an enlarged, fragmentary cross sectional view of the extensible linkage of the control taken along line 6—6 of FIG. 3.
Figure 5:
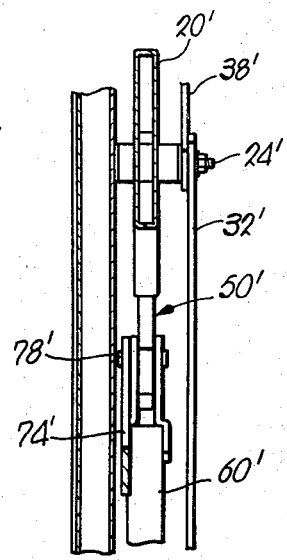
FIG. 5 is an enlarged, fragmentary cross sectional view taken on line 5—5 of FIG. 3.

Control 68 includes an extensible linkage structure 72 which interconnects the beam 20 and tailgate 64, and as shown best in FIGS. 4 and 6, linkage 72 includes a pair of elongated, longitudinally slotted links 74 and 76, the link 74 being pivotally connected at one end to the gear segment 50 by the same pin 78 that connects the upper end of member 60 with segment 50, while the opposite end of link 76 is connected to a triangular, formed plate 80 on tailgate 64 by spring loaded adjusting assembly 82. By virtue of adjusting assembly 82, dimensional variances in the manufacturing of the tailgate control may be accommodated for as required. Each link 74 and 76 is provided with a longitudinally extending slot 84 within which a laterally extending limit pin 86, or equivalent structure, from the other link rides during extension and retraction of linkage 72.

Control 68 also includes a swingable latch 88 for releasably holding the tailgate 64 in its closed position, the latch 88 being conveniently operated by the driver of the implement through a cable 90. Further, the control 68 includes a special, elongated, safety coil spring 92 which is connected at its upper end to the body 10 and at its lower end to the apex of plate 80 so that the point of connection of spring 92 to the tailgate 64 if offset forwardly of an imaginary line drawn between the axis 66 of tailgate 64 and the connection of spring 92 at its upper end to body 10 when tailgate 64 is closed.

OPERATION

As the piston and cylinder assemblies 52 and 52' are operated in unison from their positions illustrated in FIG. 1, the beams 18 and 18' swing downwardly at their segmented ends 48 and 50 to transmit driving force to the beams 20 and 20', hence raising all four corners of the press 12 simultaneously and with an equal amount of movement at each corner. When the press 12 is thus fully raised, the container 10 is in condition for receiving a load of material, and such loading takes place continuously until such time as a compression stroke is desired. At that point in time, the operation of assemblies 52 and 52' is reversed so that the toothed ends 48 and 50 of beams 18 and 18' are swung upwardly, hence transmitting equal pulling forces to all four corners of the press 12 through the interacting beams 20 and 20'. Should any lag between the mechanisms 14 and 16 tend to arise because of crop conditions, non-uniform loading of the body 10, unequal pressures in rams 52, or mechanical tolerances in the components of the mechanisms 14 and 16, such differential will be transmitted through the torque tube 56 and the mechanisms 14 and 16 thereby equalized.

During reciprocation of the press 12, the tailgate 64 is maintained closed by latches 88 and 88'. Also during this period of reciprocation, the linkages 72 and 72' extend and retract in lost motion fashion as their respective beams 20 and 20' oscillate. This may be understood best by comparing FIGS. 1 and 2, wherein it may be seen in FIG. 1 that linkage 72 is fully extended when the narrow end of beam 20 is lowered, and is fully retracted when the narrow end of beam 20 is raised as in FIG. 2. The extensibility and the retractability of the linkages 72 and 72' should be adequate to permit a full stroke by the press 12 in both directions when the gate 64 is locked without transmitting any push or pull action to the linkages 72 and 72'. When tailgate 64 is held closed, the linkages 72 and 72' thus have no positive effect upon tailgate 64 and are functionally isolated from tailgate 64 as they are shifted by the beams 20 and 20'.

Once a stack has been completely formed within body 10 and it is desired to unload the stack therefrom through end 62, the latches 88 and 88' are released by cables 90 and 90' so that the springs 92 and 92' urge tailgate 64 away from end 62 because of the yieldable bias of springs 92 and 92' on the gate 64. The points of connection of the springs 92 and 92' with the gate 64 in relation to their points of connection with the body 10 should be adequately spaced from hinge 66 (as shown, for example, both upwardly and inwardly of the hinge 66) to assure such initial opening of the gate 64 when considering the strength and tensioning of the springs 92 and 92'.

Preferably, before releasing latches 88 and 88', the press 12 will be lowered, approaching the condition of FIG. 1 so that the linkages 72 and 72' are well extended. The extent to which press 12 may be lowered at this time depends upon the height of crop buildup. The assemblies 82 cushion the linkages 72 and 72', even though the press 12 may not be fully lowered, as the springs 92 and 92' snap the gate 64 away from the end 62 until linkages 72 and 72' are fully extended.

As the press 12 is then progressively raised by mechanisms 14 and 16 and the tailgate 64 seeks to descend by gravity after being initially urged away from end 62 by springs 92 and 92', the fully extended linkages 72 and 72' progressively allow tailgate 64 to swing toward the ground as shown in FIG. 3 at the rate governed by the speed of the mechanisms 14 and 16. When tailgate 64 has then completely reached the ground, it may serve as a ramp down which the stack within container 10 may be moved.

In practice it has been found desirable to provide more of a press stroke than is necessary to lower tailgate 64 to the ground when the latter is in a level condition. Thus, when the tailgate 64 is lowered to the position shown in FIG. 3 and the ground is level, the linkages 72 and 72' may actually begin to retract for a short distance after the tailgate 64 reaches the ground and the press stroke continues. In this manner, should the tailgate 64 be lowered into a depression, sufficient press stroke can still be made available to assure that tailgate 64 is fully grounded before the stack is unloaded. Further, contrary to the precise conditions shown in FIGS. 1 and 2, the linkages 72 and 72' may not be fully extended and retracted when press 12 is at the corresponding limits of its travel so that tolerance buildup in the moving parts can be accommodated.

After unloading the stack from container 10, the tailgate 64 may then be raised to its closed position by reversing the piston and cylinder assemblies 52 and 52' so that the press 12 is lowered by mechanisms 14 and 16, hence causing the linkages 72 and 72' to pull the tailgate 64 upwardly against end 62. Cam latches 88 and 88', provided with springs 94, operate automatically to receive pins 96 and hold tailgate 64 in place.

It should be noted that the springs 92 and 92' are important because they aid not only in getting tailgate 64 started during opening thereof, but also in braking its movement toward the ground for safety purposes once such movement has commenced. When latches 88 and 88' are released, the springs 92 and 92' seek to retract by pulling the apexes of plates 80 and 80' rearwardly and upwardly, hence opening tailgate 64. Such initial movement displaces the center of gravity of tailgate 64 rearwardly out of vertical alignment with axis 66, so that the tailgate 64 then swings downwardly by gravity, whereupon the springs 92 and 92' reverse their roles and stretch to cushion further descent of tailgate 64.

Having thus described the invention, what is claimed as new and desired to be secured by Letters Patent is:

1. A stacker including:

a container adapted to receive a crop to be stacked;

apparatus including a reciprocable compressor associated with the container for periodically compacting the crop into a stack conforming substantially in size and shape with the container, said container having an open end through which the stack passes during unloading;

a gate movable on said container into and out of closing relationship to said end;

means releasably holding the gate in said closing relationship; and structure operably coupling said gate with said apparatus and shiftable during each actuation of the latter, said structure controlling movement of the gate only when said holding means is released.

2. A stacker as claimed in claim 1, wherein said structure pulls on said gate during said movement of the latter.

3. A stacker as claimed in claim 1, wherein said structure is extensible.

4. A stacker as claimed in claim 3, wherein said structure is provided with means limiting its extension.

5. A stacker as claimed in claim 1, wherein said gate is provided with means automatically initiating movement of the gate out of said closing relationship when said holding means is released.

6. A stacker as claimed in claim 5, wherein said initiating means is operable to retard further movement of said gate out of said relationship after said initial movement of the gate.

7. A stacker as claimed in claim 1, wherein said apparatus includes drive mechanism for said compressor, said structure being connected at one end to said mechanism and at the opposite end to said gate.

8. A stacker as claimed in claim 7, wherein said structure is extensible.

9. A stacker as claimed in claim 8, wherein said structure is provided with means limiting extension thereof.

10. A stacker including:

a container adapted to receive a crop to be stacked;

a reciprocable compressor associated with the container for periodically compacting the crop into a stack conforming substantially in size and shape with the container, said container having an open end through which the stack passes during unloading;

mechanism for actuating the compressor;

a gate movable on said container into and out of closing relationship to said end;

means releasably holding the gate in said closing relationship; and structure linking said mechanism with the gate for controlling said movement of the gate when said holding means is released.

11. A stacker as claimed in claim 10, wherein said mechanism includes a member swingable on said container, said structure being extensible for operation during swinging of the member.

12. A stacker as claimed in claim 11, wherein said structure is provided with means limiting its extension.

13. A stacker as claimed in claim 10, wherein said mechanism includes a pair of motion transmitting beams mounted on said container for swinging about spaced axes and interconnnected for swinging in opposite directions with respect to one another, said structure being extensible and being connected at one end to one of said members and at the opposite end to said gate.

14. A stacker as claimed in claim 13, wherein said structure is provided with means limiting its extension.

15. A stacker as claimed in claim 14, wherein said gate is swingable on the container and said structure lowers the gate to a position serving as a ramp when the compressor is moved to one end of its path of travel.

16. A stacker as claimed in claim 15, wherein said structure includes a pair of interconnected links shiftable relatively when the gate is locked in a closed position and when said compressor is reciprocated.

17. A stacker as claimed in claim 16; and means cushioning the extension of said links when the gate is unlocked and commences its movement toward said ramp position.

18. In a farm implement having a body provided with a pair of sides and a normally locked, upstanding endgate swingable outwardly and downwardly toward the ground, reciprocable structure carried by the body, and a swingable mechanism on each side respectively of the body for reciprocating said structure, a gate control comprising:

a pair of links pivotally connecting the gate and each mechanism respectively, each pair of links being extensible, permitting reciprocation of said structure while the gate is locked without affecting the gate, each pair of links having stop means for limiting the extensibility thereof whereby, when the gate is unlocked, reciprocation of said structure raises and lowers the gate.

\* \* \* \* \*